Nov. 24, 1931.     A. MOORHOUSE     1,833,401
MOTOR VEHICLE
Original Filed April 26, 1924     3 Sheets-Sheet 1
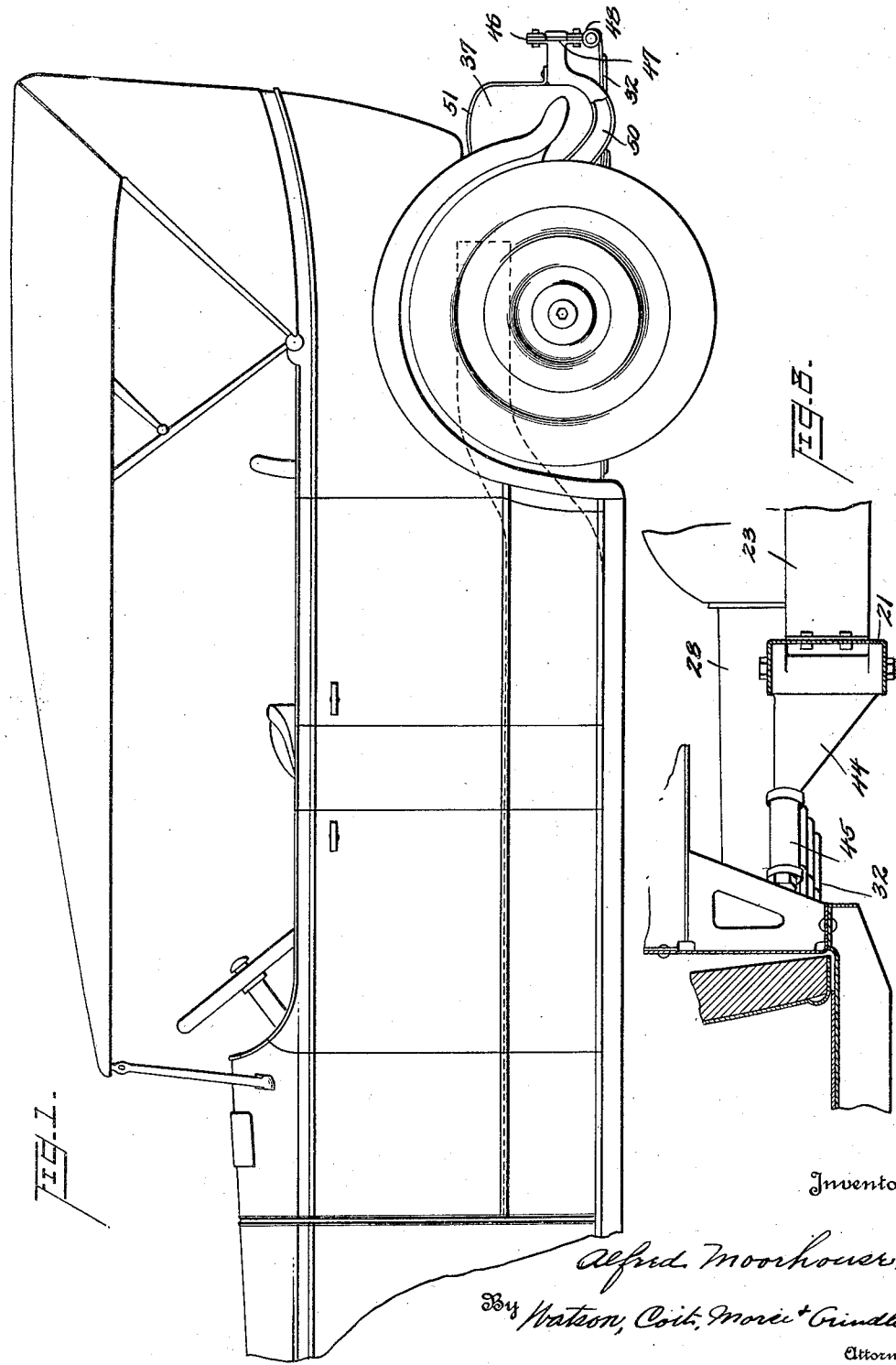

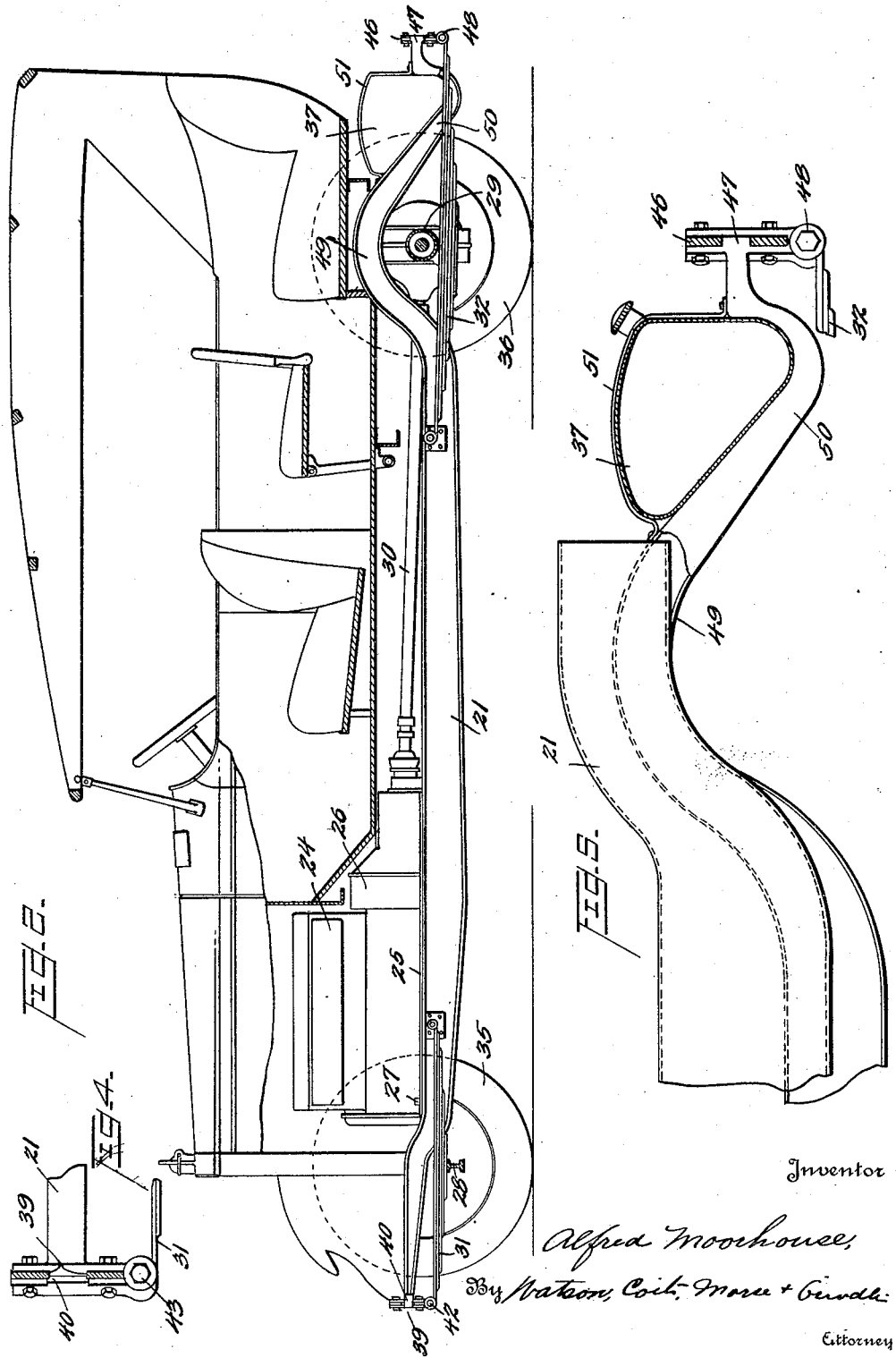

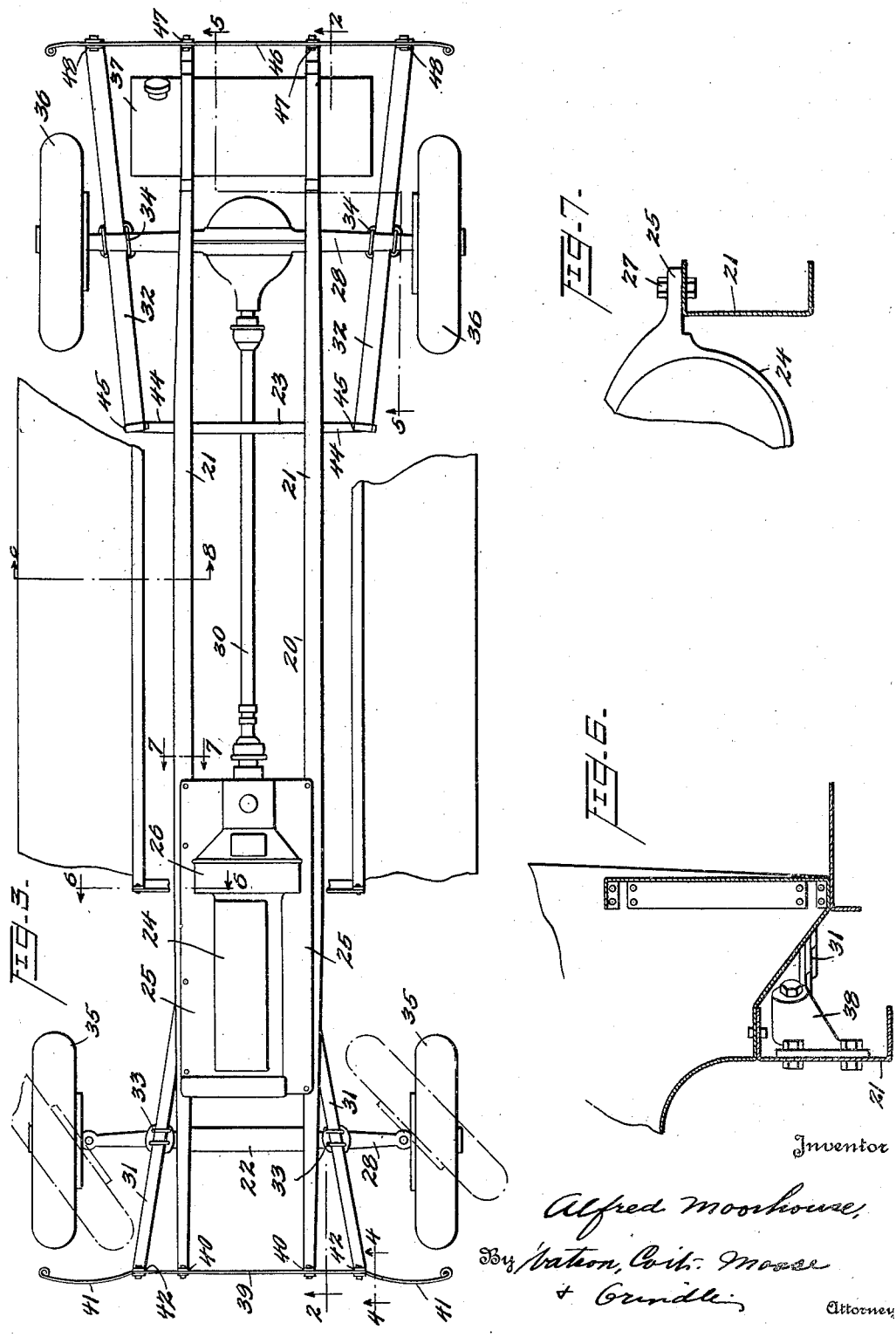

Patented Nov. 24, 1931

1,833,401

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Original application filed April 26, 1924, Serial No. 709,101. Divided and this application filed October 3, 1927, Serial No. 223,745. Renewed September 10, 1931.

This invention relates to motor vehicles and particularly to the chassis construction thereof.

One of the objects of the invention is to produce a strong and light vehicle.

Another object of the invention is to provide combination bumper and spring supports for a motor vehicle chassis.

Another object of the invention is to provide a simplified fuel tank arrangement and support on the vehicle.

Another object of the invention is to provide a narrow chassis frame so that the motor may rest directly upon it.

Other objects of the invention will appear from the following description taken in connection with the drawings, which form a part of this specification, and in which:

Fig. 1 is a side elevation of part of a motor vehicle embodying the invention;

Fig. 2 is a vertical longitudinal section through the vehicle shown in Fig. 1, the section being substantially on the line 2—2 of Fig. 3;

Fig. 3 is a plan view of the vehicle chassis;

Fig. 4 is an enlarged detail section on the line 4—4 of Fig. 3;

Fig. 5 is a somewhat enlarged detail view, partly in section, on the line 5—5 of Fig. 3;

Fig. 6 is an enlarged section substantially on the line 6—6 of Fig. 3;

Fig. 7 is an enlarged section on the line 7—7 of Fig. 3;

Fig. 8 is an enlarged transverse sectional view substantially on the line 8—8 of Fig. 3.

This application is a division of my copending application Serial No. 709,101, filed April 26, 1924.

Referring to the drawings 20 represents the chassis frame having side bars 21 and several cross members 22 and 23. The motor, clutch and transmission unit is shown at 24 and this unit is mounted directly upon the side members 21 of the frame, the frame side members being relatively close together so that there is just room for the motor to fit down between them and for the flanges 25 of the motor unit to rest on the side members. The fly-wheel housing of the motor is represented at 26 and it will be seen that the frame side members are only slightly farther apart than the diameter of the fly-wheel.

In Fig. 7 it will be seen that the side member 21 is of channel section and its flanges are turned outwardly so that the channel is accessible from the sides of the vehicle. The motor unit flanges 25 are secured to the upper flanges of the side bars 21 as by several bolts 27. This arrangement of frame and engine forms a very rigid construction and permits of a very simple casting for the motor unit.

At the front end of the frame is the vehicle steering axle 28 and at the rear end is the driving axle 29. A propeller shaft 30 extends from the motor and transmission unit to the rear driving axle for driving the vehicle in the usual way.

The axles are connected to the chassis frame by four springs, the front springs being indicated at 31 and the rear springs at 32. All of these springs are arranged somewhat diagonally, as shown more particularly in Fig. 3, and they are secured intermediate their ends to their respective axles. The front springs are so secured at 33 and the rear springs at 34.

One of the advantages of this diagonal arrangement of the springs is that it brings the inner ends of the springs, that is, the rear ends of the front springs and the front ends of the rear springs, closer to the narrow chassis frame which is used in this construction, so that these inner ends may be shackled to the frame or to relatively short brackets on the frame, and at the same time it separates the outer ends of the springs, that is, the front ends of the front springs and the rear ends of the rear springs, from the narrow chassis frame so that flexible cross brackets may be used to connect these outer ends of the springs to the frame. Also, at the front end of the chassis it permits of a wider swinging of the steering wheels. When the steering wheels are swung to the left as shown in dotted lines in Fig. 3, the left wheel is, of course, swung farther around than is the right wheel, because the left wheel must turn with a shorter radius, this difference in the turning of the wheels being taken care of by the usual steering connections, not shown in the drawings. When the wheels are thus turned the left wheel has plenty of clearance with the diagonally arranged springs and, because the right wheel does not turn so far, it still has plenty of clearance at the front end of the spring. Of course the same situation exists when the wheels are turned to the right.

At the rear end of the vehicle the diagonal arrangement of the springs provides a larger space for the fuel tank which is usually mounted at this point.

The steering wheels referred to above are indicated at 35 and the driving wheels on the rear axle are numbered 36, while the fuel tank, referred to above, is numbered 37.

The rear ends of the front springs extend into the channels of the frame side members 21, as shown particularly in Figs. 3 and 6, and pivot brackets 38 connect these spring ends to the frame members, the brackets being mounted in the channels and secured to the frame members 21 as shown in Fig. 6.

The outer or front ends of the front springs 31 are connected to the front ends of the frame members 21. As shown, these connections form a part of the front bumper of the vehicle. The bumper is indicated at 39 and it extends transversely of the vehicle and is attached to the front ends of the frame members 21 as at 40. The bumper extends laterally in front of the steering wheels as shown at 41 and at the points 42 it is connected to the front ends of springs 31. This is preferably a pivotal connection as shown at 43 in Fig. 4.

The bumper 39 is preferably of spring material thereby making it flexible so that it forms a flexible bracket for the front ends of the front springs of the vehicle.

The front ends of the rear springs 32 of the vehicle are pivoted to suitable brackets 44 extending laterally from the frame members 21. The pivotal connection to these brackets is indicated at 45 both in Fig. 3 and Fig. 8. The rear ends of the springs 32 are connected to the chassis frame similarly to the front ends of the front springs. Thus a bumper bar 46 extends across the rear end of the vehicle and is connected to the frame members 21 at 47 and to the spring rear ends at 48.

The frame members 21, as shown particularly in Figs. 2 and 5, are bent upwardly over the rear axle 29 as at 49, and rearwardly of the axle these frame members dip as at 50 to form a seat for the fuel tank 47 above referred to. Straps 51 extend around the tank and secure it to the frame members.

While I have herein described in some detail, a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a frame, an axle, a spring secured to the axle intermediate its ends and having one of its ends connected to the frame, a bumper connected to the frame and to the other end of said spring and being sufficiently flexible to absorb the change in length of the spring upon flexure.

2. In a motor vehicle, the combination of a frame, an axle, a spring secured to the axle intermediate its ends and having one of its ends connected to the frame, and a flexible bumper connected to the frame and the other end of said spring, said connection from the bumper to the spring end being a single pivotal connection whereby the change in length of the spring upon flexure is taken up by the bumper.

3. In a motor vehicle, the combination with the frame having side bars, an axle, a spring secured intermediate its ends to said axle, a connection from one end of the spring to said frame, the other end of said spring and the end of the frame being substantially in transverse alignment, a flexible bar bumper extending crosswise of the vehicle and secured directly to the frame and a single pivot attaching said bumper to said spring.

4. In a motor vehicle, the combination of a frame, an axle, a spring secured intermediate its ends to said axle and arranged diagonally of the frame and axle, means connecting one end of said spring to said frame, and a flexible bracket connecting the other end of said spring to said frame, the ends of said spring being directly pivoted to the frame and bracket.

5. In a motor vehicle, the combination of a frame having a side bar, an axle, a spring connected to the axle somewhat diagonally so that one of its ends is adjacent the frame and its other end is somewhat remote therefrom, means connecting the adjacent end of said spring to said frame, and a flexible bracket connecting the other end of said spring to said frame, the ends of said spring being directly pivoted to the frame and bracket.

6. In a motor vehicle, the combination of the front end of the vehicle frame, an axle, a pair of springs connected to the axle and arranged diagonally so that their rear ends are adjacent the vehicle frame and their forward ends are somewhat removed from the frame, means connecting the rear ends of the springs to the frame, and a flexible bumper extending crosswise of the vehicle and connected to the frame and pivoted directly to the front ends of said springs.

7. In a motor vehicle, the combination with the frame thereof, the steering axle thereof, and the steering wheels on said axle adapted to swing on their steering pivots, of a pair of springs connected to said axle and arranged somewhat diagonally so that their rear ends are closer together than their forward ends, and resilient means directly connecting the front ends of said springs to said frame.

8. In a motor vehicle, the combination with the frame thereof, the steering axle thereof, and the steering wheels on said axle adapted to swing on their steering pivots, of a pair of springs connected to said axle and arranged somewhat diagonally so that their rear ends are closer together than their forward ends, means connecting the rear ends of said springs to said frame and a transversely extending flexible bracket connecting the front ends of said springs to said frame.

9. In a motor vehicle, the combination of a frame, an axle, wheels pivoted at the ends of the axle for steering the vehicle, semi-elliptical springs secured intermediate their ends to the axle, a single pivotal connection for the rear end of each spring to the frame, and a single pivotal connection for the front end of each spring to the frame.

10. In a motor vehicle, the combination of a frame, an axle having steering wheels thereon, springs extending longitudinally of the vehicle and connected to the axle intermediate their ends, a pivotal connection for the rear end of each spring to the frame, and a connecting means for the front end of each spring to the frame, said connecting means permitting movement only in a horizontal plane.

In testimony whereof I hereunto affix my signature.

ALFRED MOORHOUSE.